United States Patent [19]

Clemenson

[11] Patent Number: 4,675,829

[45] Date of Patent: Jun. 23, 1987

[54] METHOD AND APPARATUS FOR BUILDING KNOWLEDGE-BASED SYSTEMS

[75] Inventor: Gregory D. Clemenson, Palo Alto, Calif.

[73] Assignee: Intellicorp Corporation, Mountain View, Calif.

[21] Appl. No.: 634,949

[22] Filed: Jul. 27, 1984

[51] Int. Cl.[4] .............................................. G06F 15/18
[52] U.S. Cl. .................................................... 364/513
[58] Field of Search ................ 364/513, 200 MS File, 364/300, 900 MS File, 419

*Primary Examiner*—Jerry Smith
*Assistant Examiner*—Allen MacDonald
*Attorney, Agent, or Firm*—Townsend and Townsend

[57] ABSTRACT

An efficient inherit on store technique for performing inheritance in a modular form caches summary inheritance information at each node or slot in a knowledge representation frame. The functional characteristics of each node is independent of all other nodes so that different types of inheritance information can be interpreted without special concern about the source or inheritance path. To this end, the invention uses a third kind of value besides a local value and an inherited value, herein called a combined value. The combined value according to the invention represents a summary of the subgraph above a given node. Given an adequate summary, the inheritance mechanism according to the invention needs only to consider the local value of a node and the combined value of its immediate parents. From this information, the inheritance mechanism can produce a combined value for local node and can generate an inherited value to be expressed by the local node. The combined value is used by all descendant nodes to generate inherited values for the respective nodes.

14 Claims, 5 Drawing Figures

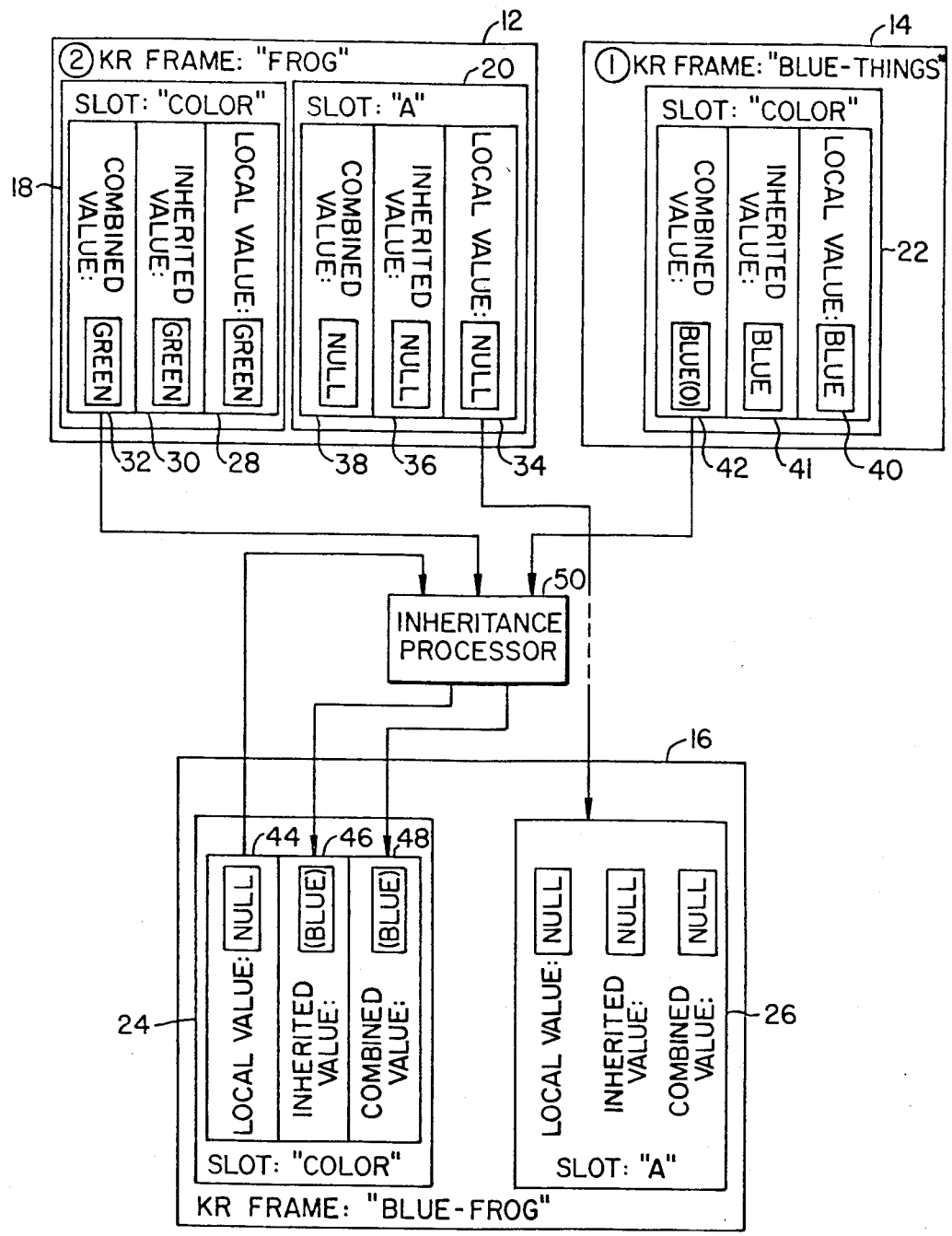
FIG._1.

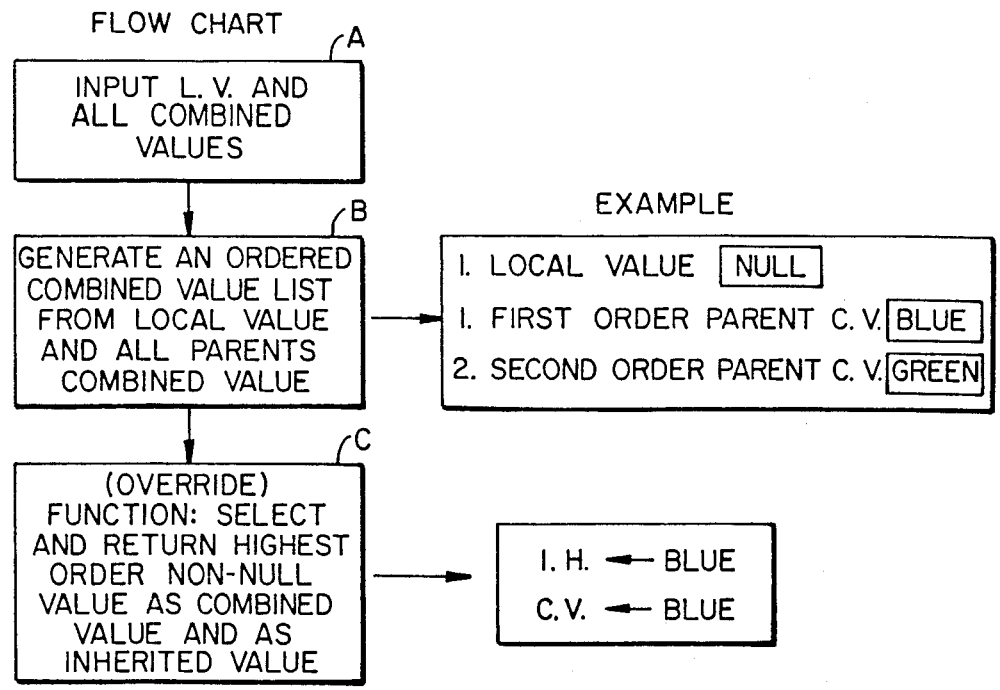
FIG._2.
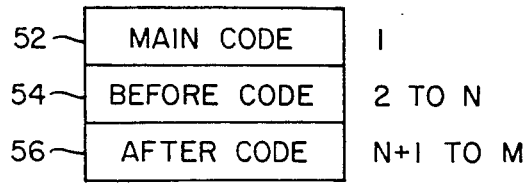
FIG._3.

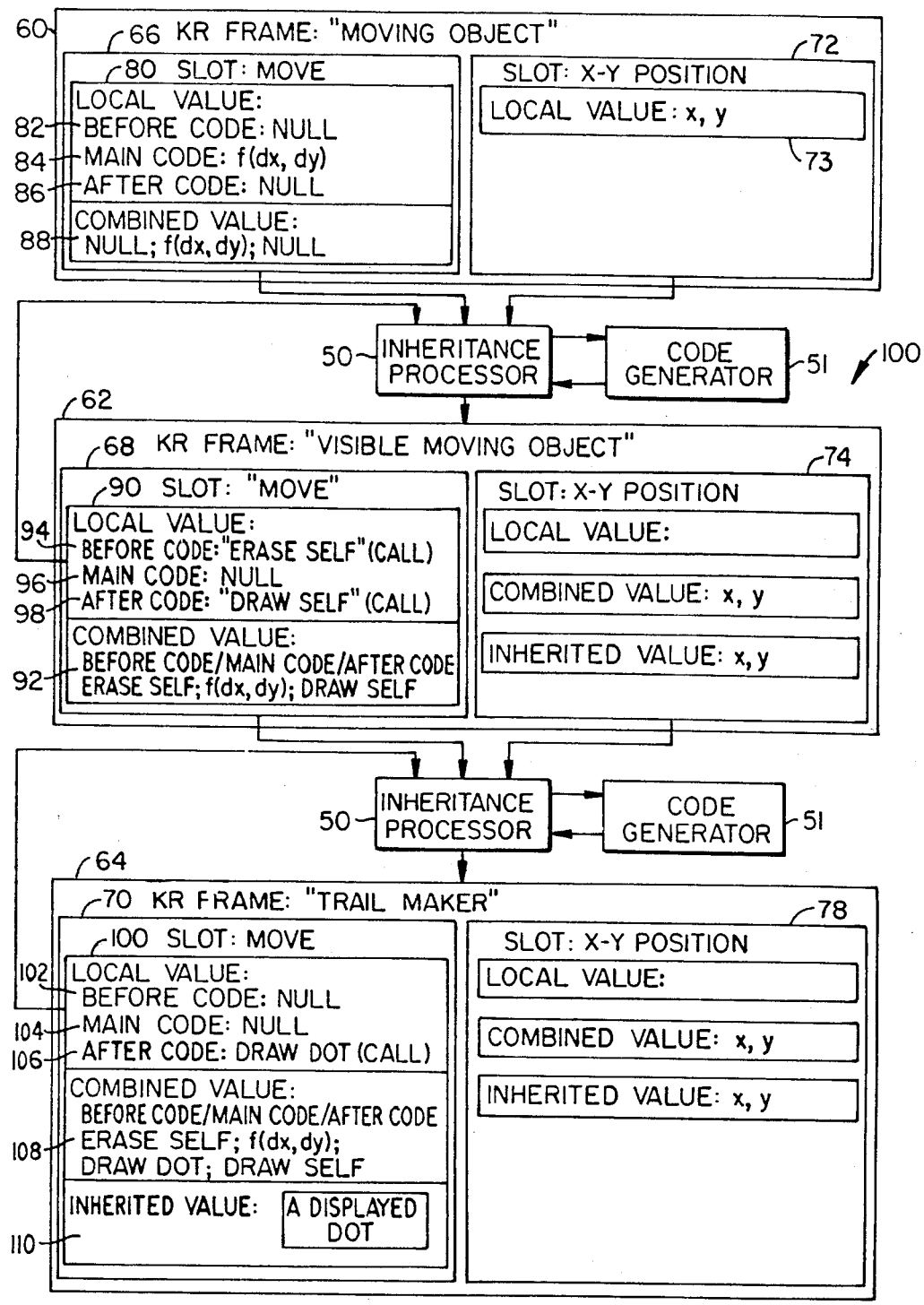
FIG._4.

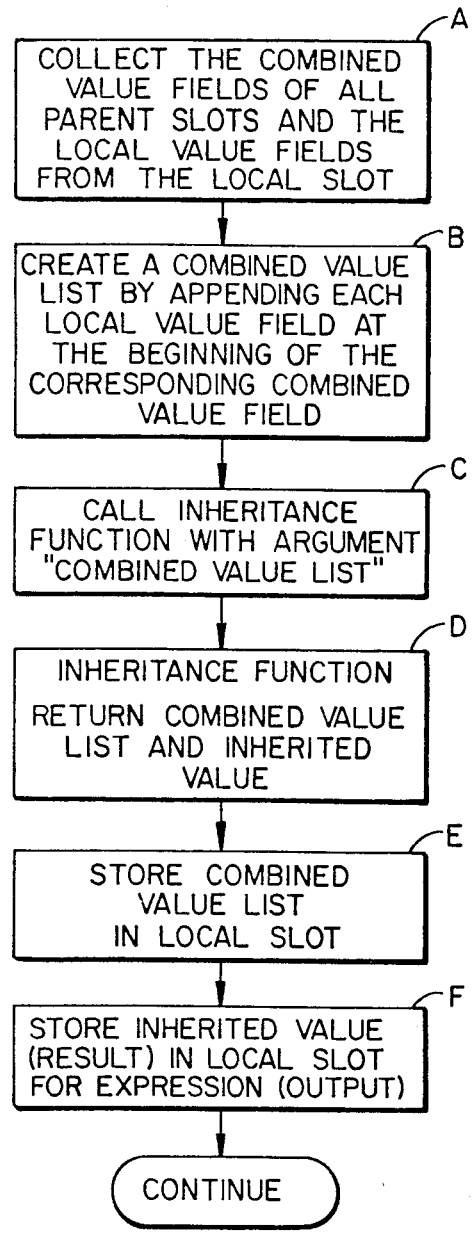
FIG._5.

METHOD AND APPARATUS FOR BUILDING KNOWLEDGE-BASED SYSTEMS

BACKGROUND OF THE INVENTION

This invention relates to the field of artificial intelligence, for example to the field of expert systems or knowledge-based systems.

Artificial intelligence (AI) technology is a discipline with an ultimate goal of providing a machine that is capable of reasoning, making inferences and following rules in a manner believed to model the human mind. A great deal of theoretical work has been done in this discipline, and much remains to be done. Artificial intelligence theory is beginning to find applications because of the hope that its principles can be effectively applied to develop better computer software and to provide to relatively untrained users sophisticated computer power to solve practical problems such as to assist in the analysis of massive amounts of relatively unprocessed data to aid in decision-making processes.

As AI technology begins to demonstrate potential and practical uses, tools are needed to speed development of practical computational systems. AI specialists have developed a number of AI-dedicated computer languages to assist in this development. Among the languages are LISP and PROLOG. However, these languages are not particularly easy for either skilled AI researchers or minimally-trained user/programmers to use to develop sophisticated and complex knowledge bases necessary to solve the problems related to artificial intelligence applications. Hence, tools are needed which are better suited to the requirements of both a minimally-trained knowledge base user and a skilled AI researcher.

In order to understand the context of the present invention, it is helpful to study the background developments in AI technology as they relate to the present invention. A primary source of information is *The Handbook of Artificial Intelligence,* Volume I, edited by Avron Barr and Edward Feigenbaum (published by William A. Kaufmann, Inc., of Los Altos, Cal.), Chapter III, "Knowledge Representation". The subject matter of this chapter is incorporated herein by reference and made a part hereof.

It is helpful to understand what is meant by knowledge and a knowledge base as now understood. Knowledge in the pragmatic terms of artificial intelligence is described in terms of its representation. Knowledge is a combination of data structures and interpretive procedures which, if suitably manipulated (as by a suitably programmed computing machine), will lead to what might best be termed "knowledgeable" behavior. A knowledge base is a set of knowledge representations which describes a domain of knowledge. A knowledge base is to an artificial intelligence environment what a database is to a conventional computer program. Unlike a database, however, a computer knowledge base can include executable program material within a defined record herein called a slot.

Knowledge representation techniques and theories are still in evolution. Nevertheless, knowledge representation appears to be classifiable into three categories.

The first category is that of descriptive knowledge. This category is the collection and classification of facts and categorizations about an idea or entity which might be acted upon. The basic units of descriptive knowledge are generally called frames, as hereinafter explained. They have also been known variously as units, concepts or objects. The term frame lacks some precision of meaning due to its use in other disciplines. Therefore, hereinafter a basic unit of descriptive knowledge is denoted a knowledge representation frame or KR frame. A KR frame contains one or more slots. However, any hierarchical data structure can be described in terms of nodes of information containing slots as components of the node. The descriptions herein therefore are not necessarily limited to KR frame applications, but may find application in any similarly organized hierarchical data structure.

The second category of knowledge representation is that of procedural representation in the form of rules or structured reasoning procedures. This category includes the structural capability to make choices. The premise-conclusion (IF THEN) format is a typical representation of a procedural knowledge conditional expression. Procedural knowledge emphasizes action and is encoded into a knowledge base as a rule in conditional expression form. The procedural knowledge may reside in a slot of a KR frame.

The third category is that of logic programming. Knowledge is represented as first order predicate calculus statements. Examples of languages using logic programming are the language of the so-called fifth generation computers of the Japanese, called PROLOG and the language MRS employed at Stanford University.

Over approximately the past decade, various attempts have been made to develop commercially useful knowledge representation languages which are useful for research and eventually for commercial applications. Among the efforts have been FRL (Frame Representation Language), KRL (Knowledge Representation Language), KL-ONE, NIKL, SMALLTALK, STROBE and UNITS. The present invention is the direct result of analyzing and then totally reworking the UNITS language coupled with discovery of solutions to problems to permit the practical manipulation of descriptive knowledge representation and procedural knowledge representation in the same environment. The result is a higher-level flexible knowledge representation "language" which has been identified as the KEE "language". Moreover, the KEE "language" has the elements of a knowledge base itself, which adds versatility heretofore unknown among artificial intelligence development tools.

One of the attributes of artificial intelligence is the concept of inheritance. It is a development of the idea of using a hierarchical structure for relating a knowledge base or database. The key to these structures is the concept of connecting relations between structures of data or knowledge through which information about attributes may pass to other structures of data or knowledge. The concept of inheritance has a number of advantages. First, an inheritance mechanism allows the specification of many components of a data structure or knowledge structure through reference to other data structures or knowledge structures. As used herein, high-level data structures or knowledge structures refer to organized collections of simpler data structures or knowledge structures, such as a collection of various relations in a relational database sense, or a collection of logical assertions as in the predicate calculus sense. Second, an inheritance mechanism can assure consistency among high-level data or knowledge structures. That is, the inheritance mechanism can be used to specify that a given data or knowledge structure must obey restrictions placed on characteristics from other data or knowledge structures. inherited from other data or knowledge structures.

Third, the inheritance mechanism allows the implementation of semantics. That is, the inheritance mechanism is a technique for combining higher level concepts and specifying meaning.

The concept of representing knowledge as hierarchical data structures with inheritance was first referred to in terms of "frames" by its most prominent early supporter, Marvin Minsky of the Massachusetts Institute of Technology. Minsky gave the first general description of the concept and laid the intellectual groundwork for development of practical systems implementation of a frame-based system. Subsequent work in first generation knowledge representation systems produced very stylized inheritance mechanisms lacking in flexibility or yielding inheritance structures which were cumbersome and so slow as to be of only limited utility in large knowledge bases.

There are two general strategies for when to perform inheritance, namely, "inherit on store" and "inherit on fetch". Inherit on store causes inheritance to be performed only when a value is stored in a slot. Inherit on fetch causes inheritance to be performed only when a value is retrieved from a slot. Nearly all prior languages have employed inherit on fetch schemes because of the assumption that inheritance was such an inefficient process that inheritance was best delayed until it became necessary to use values actually requiring inheritance. Inherit on fetch was therefore the preferred inheritance strategy.

Inherit on store was considered inherently cumbersome because it required the performance of inheritance on every descendant, some of whose values may not be of interest, thus requiring unnecessary work and loss of time. However, the inherit on fetch strategy requires more complex bookkeeping, making the inherit on fetch strategy relatively costly in a typical application. The lowest element in each tree is most likely to be changed most often. An inherit on fetch strategy more frequently results in developing a subgraph stretching from a bottom node through top nodes. Such a mechanism can be extremely time consuming and thus very costly.

Previous inheritance technology has generally recognized two kinds of values elements in a slot. The values recognized have been the local value, or the value given locally by the slot definition, and the inherited value, or the value expressed by the slot of the local KR frame. Conventional technology has taught that inheritance of attributes could only be correctly implemented and expressed by collecting local information and collecting all local information of all ancestral slots each time KR frame or data structure relations changed. Heretofore, conventional inheritance processes operated by performing a lookup of potentially all ancestor nodes in order to determine inherited information, and then such information was combined with local information to yield an "inherited value". A full lookup or traversal could only be avoided in cases where there was special information about how the inheritance was to be performed along the paths of the inheritance structure. The known techniques for avoiding a complete reconstruction of the inheritance structure have required that each kind of inheritance mechanism encode its own particular way of bypassing or shortcutting the traversal task.

What is needed is a mechanism for improving or eliminating the known cumbersome inheritance techniques.

SUMMARY OF THE INVENTION

According to the invention, a summary of relevant, that is, inheritable information about a slot of a node in a hierarchical data structure, such as a KR frame, is cached, or stored in readily accessible form to make the summary available to children of the slot. The summary contains all information needed by the children to express inheritable characteristics. Inheritance can be performed by retrieving the summary merely from the immediate parents. In a preferred embodiment of the invention the summary may be stored in a subject slot within a data field herein referred to as the combined value field. However, it is to be understood that the term combined value refers generally to the summary of all information the subject slot wishes to pass on to its descendants and is not dependent on the actual form of the summary. This summary of relevant information may differ from the "inherited value", or the expression of the value of the slot. In addition, each slot, may have a "local value" representing information unique to the slot without respect to inheritance. Therefore for each slot there is a local value, a combined value and an inherited value. The invention is extremely efficient and powerful because it allows modularization of the inheritance mechanism and completely general inheritance processing, that is, inheritance processing without the use of special shortcuts. Moreover, the invention makes an inherit on store strategy a viable inheritance strategy since inheritance is limited to immediate parents.

The invention will be better understood by reference to the following detailed description taken in connection with the accompanying drawings.

BRIEF DESCRIPTION OF THE DRAWINGS

FIG. 1 is a diagrammatic representation of a knowledge base for illustrating a first kind of inheritance processing according to the invention.

FIG. 2 is a flow chart of a first kind of inheritance processing.

FIG. 3 is a diagram illustrating structure of two types of values stored in a knowledge base.

FIG. 4 is a diagrammatic representation of a knowledge base for illustrating a second kind of inheritance processing according to the invention.

FIG. 5 is a flow chart of a second kind of inheritance processing.

DETAILED DESCRIPTION OF SPECIFIC EMBODIMENTS

In the following Figures, examples will be given to illustrate different types of inheritance. First, there is shown a simple example of override inheritance, and second, there is shown an example of more complex method inheritance. It is to be understood that this is a defined, though variable, structure which is manipulated in a computer memory and a related central processing unit or distributed processing units. A suitable apparatus is a Xerox 1108 computer or other LISP-based computer. Other computers could be substituted given a suitable operating system and operating language.

In FIG. 1, there is shown an example of a knowledge base 10 having three KR frames 12, 14 and 16. The first KR frame 12 is labeled "frog". The second KR frame 14 is labeled "blue-things". The third KR frame 16, labeled "blue-frog", is related by inheritance to the "frog" KR frame 12 and the "blue-things" KR frame 14.

Each KR frame contains one or more slots. As an example, KR frame 12 contains a first slot 18 under the label "color" and a second slot 20 under the label "A". KR frame 14 contains a slot 22 labeled "color". KR frame 16 also contains a slot 24 labeled "color" and further contains a slot 26 labeled "A".

The slots of a common name are related to one another through the respective KR frames. The KR frames "frog" and "blue-things" are parent frames to the KR frame "blue-frog". Hence, the "color" slot in KR frame "frog" is a parent of the "color" slot in the KR frame "blue-frog", and the "color" slot in the KR frame "blue-things" is a parent to the "color" slot in the KR frame "blue-frog".

Within each slot is the notion or concept of a local value. As for example in "color" slot 18 is the local value 28 having a stated contents of "green". The local value is defined locally in the slot independent of any inheritance. Each slot also carries two other values: an inherited value 30 and, according to the invention, a combined value 32. An inherited value is the value of a slot representing all characteristics which would be expressed by the slot. A combined value is the value representing the raw information from which the inherited value is generated and which contains sufficient information to communicate to all descendants characteristics of all ancestors of the slot. In the example herein given, the contents of the inherited value 30 is "green", and the contents of the combined value 32 is also "green". The contents of any one of the values is not limited to a single element, depending on the definition of the slot.

Other slots of a KR frame may contain unrelated but inheritable information. In the present example, a local value 34, an inherited value 36 and a combined value 38 of the A slot have contents of null, so nothing is inherited.

The "color" slot 22 of KR frame "blue-things" 14 has by its definition a local value 40 with contents "blue", an inherited value 41 with contents "blue" and a combined value 42 with contents "blue".

KR frame 16 labeled "blue-frog" contains a slot 24 with a local value 44, an inherited value 46 and a combined value 48. The contents of the local value 44 is null. Thus, the inherited value 46 and the combined 48 must be calculated from other factors, namely from the ancestry of the slot 24.

In practice, the creation of the KR frame "blue-frog" having parents KR frame "frog" and KR frame "blue-things", creates "color" slot 24 with parents "frog" and "blue-things". According to the invention, the inherited value of the "color" slot 24 is generated by examining the combined value of the corresponding "color" slots 18 and 20 of the parent KR frames and by applying the combined values of the parent slots through an inheritance processor 50, as hereinafter explained. The inheritance processor 50 or equivalent function returns the inherited value 46 and the combined value 48. The inherited value 46 is the value expressed by the local KR frame 16, whereas the combined value 48 represents the summary of all inherited characteristics of the local KR frame 12.

FIG. 2 illustrates the operation of an override inheritance type inheritance processor function. In this simple example, the inheritance processor function consists of three steps. The steps are: input of the local value and all combined values (Step A) second, generation of an ordered list from the local value of the local slot and the combined value of corresponding slots of all parent KR frames (Step B); third, selection and return of the highest ordered non-null value as the combined value and as the inherited value for the current slot (Step C). As an example, the "color" slot 24 of the KR frame named "blue-frog" 16 would provide the local value 44 of null to the inheritance processor 50, the highest ordered "color" slot, namely "color" slot 22 from the frame "blue-things" 14, would provide the combined value of "blue" to the inheritance processor 50 and the next ordered "color" slot, namely, the "color" slot 18 of the KR frame "frog" 12 would return the combined value "green". Executing the function of the processor 50, the highest ordered non-null value would be selected from the combined value list for the local slot and would be returned as both the combined value and the inherited value to the subject slot 24. In this case the inherited value would be "blue" and the combined value would be "blue".

The inheritance processor 50 of FIG. 1 is a generalized modular processor which functions independently of any slot. However, the particular type of inheritance processor employed in practice depends on the semantic role assigned to the slot of current interest, or local slot 24. For the example in FIG. 1, the inheritance processor 50 for the current slot "blue-frog" was selected on the basis of the overriding semantic meaning of the term "blue". For a different type of slot, as in the next example a different inheritance function might be employed. The above example merely illustrates the use of the combined value function to pass on inheritable characteristics to a current slot quickly and efficiently in a generalized manner. The semantics of the local slot takes local precedence when the value of the local slot must be expressed. This is a very powerful tool for overcoming contradictions which are not taken into account unless local semantics are considered.

The simple example of an inheritance processor with override inheritance capability serves to introduce the more complex structure of method inheritance. Conventional inheritance mechanisms have presumed that method inheritance would presuppose the availability of inheritable characteristics from the entire ancestry of a slot. According to the invention, inheritance requires the combined value of the parent slots only and a generalized inheritance processor capable of processing the combined values to produce a local inherited value and a new combined value.

In method inheritance according to the invention, the combined value is a collection of pieces of executable code and the inherited value is the result produced by that collection of pieces of executable code. FIG. 3 illustrates a structure for the allocation of coding in an executable program which enables the use of method inheritance in accordance with the invention. In an artificial intelligence device or system, pieces of executable code are gathered from various parents and combined in a list for execution. In accordance with the present invention, the executable code list is divided into at least three sections: first, a main-code section 52; second, a before-code section 54; and next an after-code section 56. There may be other sections of code, such as a wrapper-code section (not shown). For the purposes of explanation, it is sufficient to show the three sections: the main-code, the before-code and the after-code. There is only one main-code section, but there may be many before-code sections and many after-code sections. The before-code sections are prefixes to the main-code, whereas the after-code sections are suffixes to the main-code. When a code list is executed, the before-code sections are executed prior to the main-code section, and the after-code section is executed after the the main-code section. The positioning of before-code and after-code typically determines the order in which the before-code or after-code is executed in a code list. However, other schemes may be used to indicate the order in which a code list is executed.

FIG. 4 illustrates a knowledge base in which the technique of method inheritance is implemented. A knowledge base 100 consists of the KR frames "Moving Object" 60, "Visible-Moving Object" 62 and "Trail-Maker" 64. Each of the KR frame 60, 62 and 64 contain a move slot respectively labeled herein a grandparent slot 66, a parent slot 68, and a local slot 70. Each of the KR frames 60, 62 and 64 also contains an x-y position slot, respectively labeled 72, 74 and 78. For purposes of illustration, discussion will be limited to the structure of the move slots 66, 68 and 70, and the related inheritance processing functions. However, it will be observed that slots 74 and 78 inherit the x,y position of their parents, respectively. The grandfather move slot 66 contains a local value 80 with fields before-code 82, main-code 84 and after-code 86. Before-code field 82 and after-code field 86 contain null values. Main-code field 84 contains the executable function f(dx,dy) which is the code for executing a specific function of the arguments and dy. The grandfather slot 66 also contains a combined value list 88 consisting of the string of fields: null; f(dx,dy); null. The source of this combined value list may have been obtained by initialization of the KR frame 60.

The x-y position slot 72 of grandfather KR frame 60 may contain a local value 73 consisting of the position coordinates of the moving object frame 60. The KR frame 62 contains the parent move slot 68 having at least local value 90 combined value 92. The local value 90 contains at least three fields, before-code 94, main-code 96 and after-code 98. In this instance, the main code field 96 of the local value 90 contains a null. The before-code field 96 contains a call or a statement equivalent to the function "erase self". The after-code field 98 contains a call or a statement equivalent to the function "draw self". The combined value 92 of the parent move slot 68 consists of the string: "erase self"; f(dx,dy); "draw self". This string of instructions is derived from the before-code and aftercode of the subject or parent slot 68 and the main-code of the grandparent slot 66 in accordance with action of the method inheritance processor 50 of the invention explained hereinafter.

Referring now to the slot of current interest or the local slot 70 of the "Trail-Maker" frame 64, there is a local value 100 containing a before-code field 102, a main-code field 104, and an after-code field 106. The before-code field 102 and the main-code field 104 in the local slot 70 may contain nulls. The after-code field 106 is shown to contain a call or instructions equivalent to the function "draw dot".

The local slot 70 also is shown to contain the combined value 108 consisting of a code list and an inherited value 110. The combined value 108 and the inherited value 110 are obtained as a result of operation of an inheritance processor 50 functioning in accordance with the invention. The inheritance function applied to local slot 70 is the method inheritance function.

In FIG. 5, there is shown an algorithm for producing the combined value 108 and inherited value 110 for the slot 70. The first step is to collect the contents of the combined value fields of all parent slots and the local value fields of the local slot (Step A). In the case of the knowledge base of FIG. 4, the contents of combined value fields of the parent slot is the list contained in combined value 92. The local value fields of the current slot 70 are the fields 102, 104 and 106 of FIG. 4.

The next step is to create a combined value list (Step B). The combined value list is created by appending the contents of each local value field at the beginning of each list of the corresponding combined value field. Since the local value fields 102 and 104 contain null values, the before-code and main-code combined value list will consist of the before-code and main-code components from the combined value field of the parent slot 68. However, the after-code 106 contains the function "draw dot". Therefore, the resultant combined value list will consist of the fields "draw dot" and "draw self", the last being the after-code element of the combined value 92 of the parent slot 68.

The next step is to call the inheritance function of the inheritance processor 50 with the arguments "combined value list" generated in Step B (Step C). Thereafter, the inheritance function is executed to retain a combined value list and an inherited value list (Step D).

The next step is to store in the local slot 70 the combined value list returned from the inheritance function. In the case of method inheritance, the combined value list is the code list: "erase self"; f(dx,dy); "draw dot"; "draw self". The final step is to store the inherited value in the local slot 70 (Step F). The inherited value in this case would be the result of executing the combined value list stored in the local slot 70.

Appendix A is a listing in the LISP language with comments of the set-up of data fields for processing by any inheritance function as represented by contents of a general-purpose inheritance processor 50. The inheritance processor 50 is for executing selected combine function codes, the details of which are not relevant to the present invention. Briefly, the combine function codes perform as follows: in the case of simple inheritance, the first non-null entry in the combined value list is returned as both the combined value and the inherited value of the current slot. In the case of method inheritance, the inheritance function first examines the main-code field of the local slot and designates the first non-null main-code element as the main-code element of the combined value code list in the local slot. The before-code fields of the combined value list are then scanned and all the before-code lists are appended as elements to the current value list. The before-code list must be executed prior to the main-code list. The before-code element of the local slot is assigned the first priority in execution of the before-code list.

Similarly, the after-code element of the combined value list is appended to the local value for the after-code. The result is a list which represents the entire combined value of the local slot.

The entire combined value list may then be presented to a code generator 51 (FIG. 4) in order to generate a function. The resultant function is the inherited value of the local slot. It is the function which results in the expression of the characteristics of the local slot.

In summary, the combined value list is the summary of all inheritable characteristics of the local slot. The inherited value is the function which, when appropriately manipulated, expresses the characteristics of the local slot. The inheritance processor is the mechanism which performs the generalized inheritance function. Two types of inheritance function have been described by way of illustration. Each time a combined value and an inherited value is required, a call is made to an inheritance processor which examines the local value of the local slot and the combined value of all immediate parents to return the appropriate values for the combined value and the inherited value of the local slot. Unlike prior inheritance techniques, there is no need to accumulate local values from all ancestral slots or to provide for special exceptions to a generalized inherit on store protocol.

A brief description of the contents of the Appendix A may be helpful to an understanding of the invention. However, it is believed that a person fluent in the LISP language would be able to read the code and recognize how to implement the described function. Moreover, it is believed that the foregoing explanation would be an adequate description of this invention for implementation by the ordinarily skilled artisan in the field. The code of Appendix A is self documenting and contains numerous comments for guidance. The convention in this code is as follows: All executable code is contained within parentheses. The first term following a left parenthesis is a function. All subsequent terms are parameters. The listing has been edited to aid in the understanding of the invention. Selected portions of code have been omitted in favor of clarity. The first section of code sets up a GERM field and related parameters as the local value for the slot. The variable pslots is set up to create the corresponding slots of all of the parents. Thus, the variable pslots is the set of all fields corresponding to a particular local field from all of the parents. Immediately thereafter is the Role Inheritance function. The Role Inheritance function is the paradigm for the simplified inheritance function described herein as Override Inheritance. Datatype Inheritance, the coding for which follows Role Inheritance, is another simplified inheritance function similar to Role Inheritance. There may be other types of simplified inheritance function, such as Default Inheritance. However, for tutorial purposes, these functions have been omitted.

The paradigm for the complex inheritance function is called Value Inheritance in Appendix A. In this inheritance function a list is created called Parents' Combined Values or PCVS. This is a collection of all combined values of parents reduced to a list. A combine function is then applied to the parents' combined value list to produce a new combined value list for the local slot. The new list is called cvalue. Alerts may also be generated to warn the user of improper conditions.

The next significant portion of code is the Install function in which the inherited value is generated from the combined value. This is conditioned on a change in value.

Finally, the values obtained from the inheritance function are returned in a variable known as inherit-spec. Inherit-spec summarizes the names of the fields of the record which have actually been changed.

The invention has now been explained with reference to specific embodiments. Other embodiments will be apparent to those of ordinary skill in the art. It is therefore not intended that this invention be limited, except as indicated by the appended claims. T,0200

I claim:

1. A method for use in inheriting knowledge representation between related slots in a hierarchical data structure having at least one parent slot and a local slot, said local slot being a child of said parent slot, said method comprising:
    storing a summary of inheritable information about said parent slot, said summary being directly accessible by said local slot and making said summary available to said local slot during inheritance without requiring additional access to ancestry of said parent slot.

2. The method according to claim 1 wherein said storing step comprises storing said summary in a field of said parent slot.

3. In a knowledge-based system, a method for use in inheriting knowledge representation between related slots comprising at least one parent slot and a local slot of related knowledge representation frames, said method comprising the steps of:
    (a) establishing for each said parent slot at least a parent slot combined value wherein each said parent slot combined value is a summary of all combined values which are inherited by said parent slot;
    (b) establishing for each said local slot at least a local slot local value, said local slot local value being capable of having a null value;
    (c) collecting for said local slot each said parent combined value from each said parent slot only; and
    (d) forming for each said local slot at least a local slot combined value from said local slot local value and from said parent slot combined value, said local slot combined value being a summary of all combined values which are inherited from at least one parent slot.

4. The method according to claim 3 wherein said forming step (d) comprises inserting said local slot local value as the first element of said local slot combined value.

5. The method according to claim 3 wherein said local slot local value and said parent slot combined values include lists defining methods.

6. The method according to claim 5 wherein each said local slot local value and each said parent slot combined value at least three fields are provided to contain said lists, namely, a before-code field, a main-code field and an after-code field, and
    wherein said collecting step (c) comprises compiling an ordered list of said lists of said main-code fields together, of said before-code fields together and of said after-code fields together.

7. The method according to claim 6 further including the step of providing a local slot inherited value, said local slot inherited value comprising results generated by operations defined by said local slot combined value.

8. The method according to claim 6 wherein said compiling step comprises ordering said lists of said local slot local value with and ahead of corresponding ones of said lists of said parent slot combined values thereby to form said local slot combined value.

9. The method according to claim 8 further including the step of providing a local slot inherited value, said local slot inherited value comprising results generated operations by defined by said local slot combined value.

10. The method according to claim 5 further including the step of providing a local slot inherited value, said local slot inherited value comprising results generated by operations defined by said local slot combined value.

11. The method according to claim 3 further including the step of providing a local slot inherited value, said local slot inherited value comprising a function for expressing characteristics of said knowledge representation frame of said local slot.

12. In a knowledge-based system, an apparatus for inheriting knowledge representation between related slots comprising at least one parent slot and a local slot of related knowlede representation frames, said apparatus comprising:

(a) means for establishing for each said parent slot at least a parent slot combined value wherein each said parent slot combined value is a summary of all combined values which are inherited by said parent slot;

(b) means establishing for each said local slot at least a local slot local value, said local slot local value being capable of having a null value;

(c) means collecting for said local slot each said parent combined value from each said parent slot only; and (d) means forming for each said local slot at least a local slot combined value from said local slot local value and from said parent slot combined value, said local slot combined value being a summary of all combined values which are inherited from at least one parent slot.

13. The apparatus according to claim 12 wherein said forming means (d) comprises means for inserting said local slot local value as the first element of said local slot combined value.

14. The apparatus according to claim 12 wherein said local slot local value and said parent slot combined values include lists defining methods operative within said apparatus.

* * * * *